(12) United States Patent
Chen

(10) Patent No.: US 10,939,533 B2
(45) Date of Patent: Mar. 2, 2021

(54) INTELLIGENT LIGHT-EMITTING DEVICE INTEGRATED WITH ILLUMINATING OBJECT

(71) Applicant: Szu-Hsiang Chen, Taipei (TW)

(72) Inventor: Szu-Hsiang Chen, Taipei (TW)

( * ) Notice: Subject to any disclaimer, the term of this patent is extended or adjusted under 35 U.S.C. 154(b) by 92 days.

(21) Appl. No.: 16/358,718

(22) Filed: Mar. 20, 2019

(65) Prior Publication Data
US 2019/0223275 A1 Jul. 18, 2019

Related U.S. Application Data

(63) Continuation-in-part of application No. 15/598,328, filed on May 18, 2017, now abandoned.

(51) Int. Cl.
| | |
|---|---|
| *A43B 1/00* | (2006.01) |
| *H05B 47/19* | (2020.01) |
| *H02J 50/10* | (2016.01) |
| *F21L 4/02* | (2006.01) |
| *F21V 23/04* | (2006.01) |
| *A43B 3/00* | (2006.01) |
| *F21V 33/00* | (2006.01) |
| *H02J 50/00* | (2016.01) |
| *H02J 7/02* | (2016.01) |
| *H05B 45/10* | (2020.01) |

(Continued)

(52) U.S. Cl.
CPC .......... *H05B 47/19* (2020.01); *A43B 1/0072* (2013.01); *A43B 3/001* (2013.01); *F21L 4/02* (2013.01); *F21V 23/0414* (2013.01); *F21V 23/0435* (2013.01); *F21V 33/0008* (2013.01); *H02J 7/025* (2013.01); *H02J 50/00* (2016.02); *H02J 50/10* (2016.02); *H05B 45/10* (2020.01); *H05B 45/20* (2020.01); *A43B 13/02* (2013.01); *A43B 13/203* (2013.01); *F21V 2200/00* (2015.01); *F21Y 2115/10* (2016.08)

(58) Field of Classification Search
CPC .............................. H05B 47/19; A43B 1/0072
See application file for complete search history.

(56) References Cited

U.S. PATENT DOCUMENTS

| | | | | |
|---|---|---|---|---|
| 5,500,635 | A * | 3/1996 | Mott ..................... | A43B 1/0072 310/311 |
| 5,704,706 | A * | 1/1998 | Goldston ............. | A43B 1/0072 362/103 |

(Continued)

FOREIGN PATENT DOCUMENTS

CA    3004999 A1 * 11/2018 ............. H04R 1/028

*Primary Examiner* — Charlie Y Peng

(57) ABSTRACT

An intelligent light-emitting device integrated with an illuminating object, the illuminator being an independent and removable component, comprising a LED light assembly, a control unit, a rechargeable battery, a switch and a wireless charging module, which are assembled and sealed to form a waterproof, portable and independent light-emitting device; the control unit configured to control different lighting mode of the LED light set and including a wireless remote control unit, remotely controlled by a light control. APP of an intelligent article; wherein the illuminating object includes a transparent or semi-transparent block with light-conducting function and a light-conducting groove; the block is a shoe sole, a lamp holder or a box; the light-emitting device is placed in the light-transmitting groove and removable therefrom.

13 Claims, 13 Drawing Sheets

(51) Int. Cl.
*H05B 45/20* (2020.01)
*F21Y 115/10* (2016.01)
*A43B 13/02* (2006.01)
*A43B 13/20* (2006.01)

(56) References Cited

U.S. PATENT DOCUMENTS

2008/0005935 A1* 1/2008 Chyn .................. A43B 1/0036
                                                          36/137
2008/0019119 A1* 1/2008 Marston ............... A43B 1/0072
                                                         362/103
2016/0374171 A1* 12/2016 Wilken ................. G05B 15/02
2020/0124240 A1* 4/2020 Jeong ....................... F21V 3/049

* cited by examiner

INTELLIGENT LIGHT-EMITTING DEVICE INTEGRATED WITH ILLUMINATING OBJECT

CROSS-REFERENCE TO RELATED APPLICATION

This patent application is a continuation-in-part of U.S. patent application Ser. No. 15/598,328, filed on May 18, 2017 and entitled "intelligent illuminator integrated with luminous object", the contents of which are hereby incorporated by reference in its entirety and made part of the present patent application for all purposes.

BACKGROUND OF THE INVENTION

(1) Field of the Invention

The present invention relates to an intelligent light-emitting device integrated with an illuminating object.

(2) Description of the Related Art

As the LED is used extensively, many objects have been equipped with LED lamps for decoration, such as luminous shoes, luminous caps and so on. When the LED lamps on the shoes or caps emit light, the objects equipped with LED lamps look dazzling, delighting the users and viewers.

However, the LED lamp on general light-emitting devices is placed in a fixed position of the object, the LED lamp cannot be removed or the mounting position cannot be changed. In different activities or uses, the user cannot remove the LED lamp to other object positions. Taking shoes as examples, jogging wearing jogging shoes at 7 p.m., and walking wearing beach sandals at 9 p.m., if the light-emitting device is fixed in the jogging shoes, it cannot be removed to the beach sandals, causing inconvenience.

Secondly, the existing luminous shoes must be equipped with charging connection, switch, light-emitting device and lighting mode switching button. The power conductor shall be connected to the LED light-emitting device, but the internal or external factors are likely to cause the break of, conductor, poor contact even failure in turning on/off and switching light source or charging, resulting in many troubles.

Furthermore, the chargeable batteries for the existing luminous shoes are lithium battery and Li-polymer. As the battery is fixed in the sole, it is likely to fire, burn and explode in the cases of puncture, bending, overcharge and short circuit, the safety shall be considered. The charging connection is required for charging, so the charging is very inconvenient.

In addition, the present luminous shoes can be integrated with color-changeable LED light source, the switch must be pressed for changing the luminous color, the user has to bend down to look for the switch button, and he shall press the button again and again to get the wanted luminous color. To turn power off, the user must bend down to look for the switch button, the operation is very inconvenient.

SUMMARY OF THE INVENTION

The technical scheme of the present invention is to provide an intelligent light-emitting device integrated with a Illuminating object, the light-emitting device being an independent and removable component, comprising: a LED light set, having a plurality of LED lighting modes; a control unit, disposed at the LED light set and configured to control different lighting mode of the LED light set, the control unit including a wireless remote control unit, remotely controlled by a light control APP of a smart product; a rechargeable battery, coupled to a bottom of the LED light set and configured to supply the power for operation; a wireless charging module, coupled to the bottom of the LED light set and configured to charge the rechargeable battery with the received energy by wireless charging method; a switch, disposed on the LED light set and configured to switch on or off the LED light set;

wherein the illuminating object comprises a transparent or semi-transparent block with light-conducting function and at least one light guiding groove configured to hold the light-emitting device; wherein the light guiding groove having an inner wall is a light transmissive surface, which is also an incident surface where the light emitted from the light-emitting device enters the block, and an outside of the block is a light emitting surface;

wherein the light-emitting device is placed in the light guiding groove of the illuminating object and can be taken out or put in at any time; when the light-emitting device emits light in the light guiding groove, the light is directly irradiated to the light transmissive surface of the light guiding groove, and then is conducted through the transparent or semi-transparent block and to the outside thereof to form a luminous part.

The advantage of the present invention is that the light-emitting device is waterproof, portable and independent, not fixed in a specific object, so it can be removed to other objects of luminous effect with a light guiding groove at any time according to the user requirement, such as shoes, lamps, boxes and other independent objects of luminous effect. Therefore, its scope of application is extensive, and the light-emitting device is not confined to a specific object. Secondly, the wireless charging mode is applied, the light-emitting device can be charged without taking it out. The light control APP of smart products (e.g. smart phone, smart watch, smart wristlet) can implement different light controls, that is more, convenient. The rechargeable battery is high safety FLCB, which is unlikely to fire, burn or explode in the cases of overcharge, bending, and puncture.

DETAILED DESCRIPTION OF THE INVENTION

Figure 2:
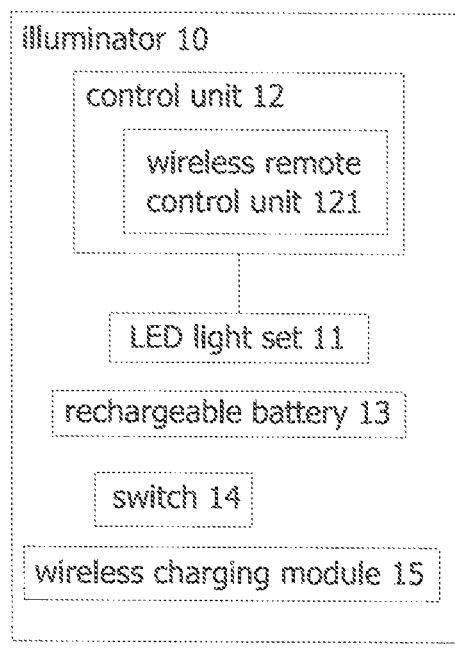
FIG. 2 is a schematic view of a light-emitting device of the present invention.
Figure 6:
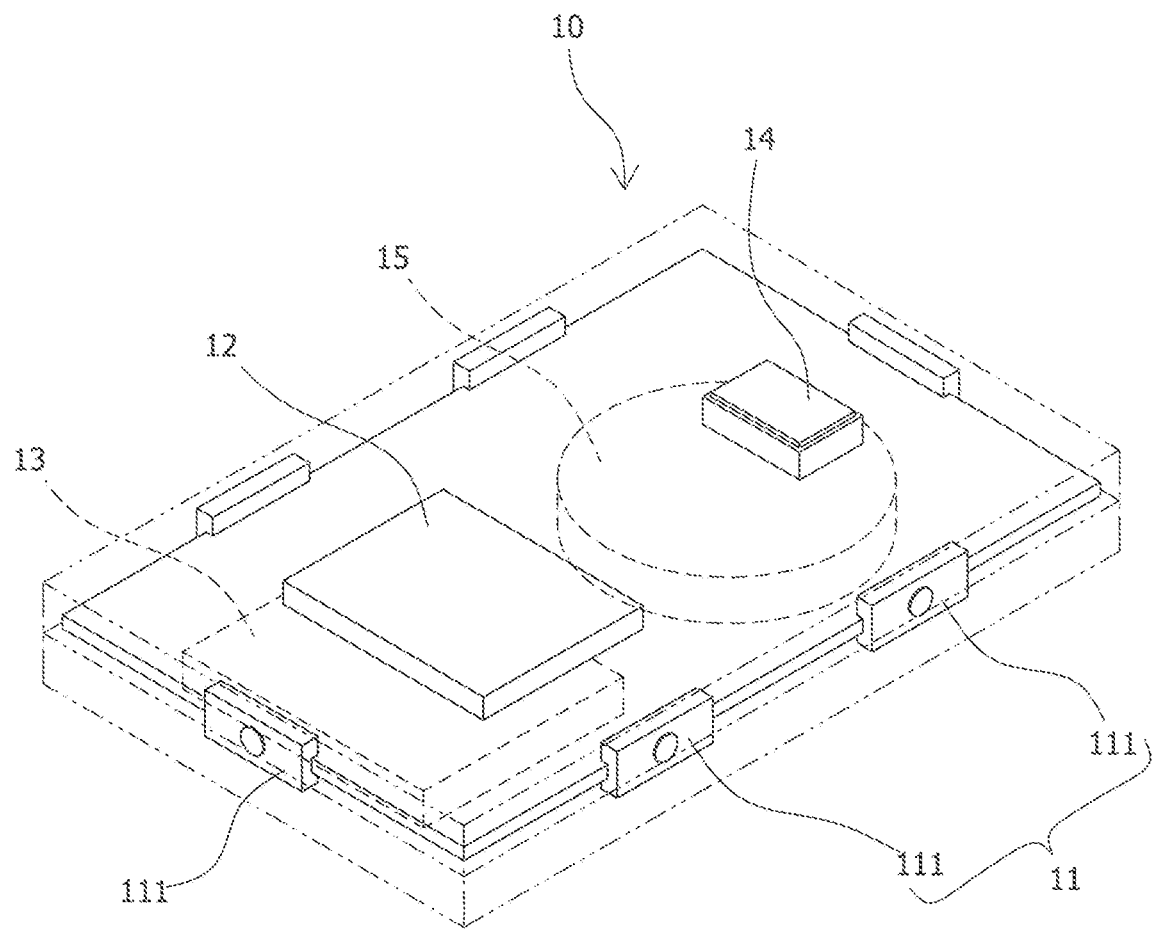
FIG. 6 is a three-dimensional schematic view of the light-emitting device.

Referring to FIGS. 2 and 6, the present invention provides a light-emitting device (10) is an independent and removable component, comprising a LED light set (11), a control unit (12), a rechargeable battery (13), a switch (14) and a wireless charging module (15).

The LED light set (11) includes a plurality of LED lighting modes; wherein the LED light set (11) are respectively surrounded by a plurality of LED luminous elements (111). The LED light set (11) can be of any shape, and a light guiding groove (31) for holding LED light set (11) can be of any shape.

The control unit (12) is disposed at the LED light set (11) for controlling lighting mode of the LED light set (11). The control unit (12) further includes a wireless remote control unit (121), remotely controlled by a light control APP (20) downloaded into a smart product (100) from outside, so as to perform relevant control actions. An user uses the light control APP (20) to wirelessly control the control unit (12), so as to control the lighting mode of the light-emitting device (10), such as the on/off, rolling mode, brightness, frequency, color and chroma of the LED light set (11). Secondly, the wireless remote control unit (121) is a Bluetooth wireless transceiver for connecting the smart product (100).

The rechargeable battery (13) is coupled to a bottom of the LED light set (11), electrically connected to the wireless remote control unit (121), control unit (12) and LED light set (11), and supplying the power for operation. The rechargeable battery (13) of the present invention using a high safety FPC Lithium Ceramic Battery (FLCB) is preferred.

The switch (14) is disposed on the LED light set (11) and electrically connected to the control unit (12). The user can use the switch (14) to switch on or off the LED light set (11). The switch 14 can be implemented as a touch switch, so there is no concave or convex disposed thereon that affects the appearance.

The wireless charging module (15) is coupled to the bottom of the LED light set (11), and configured to charge the rechargeable battery (13) with the received energy by wireless charging.

When the above-mentioned elements are assembled, they are sealed by integral molding, or contained in upper and lower mold covers and sealed by high frequency fusion for waterproofing.

Figure 1:
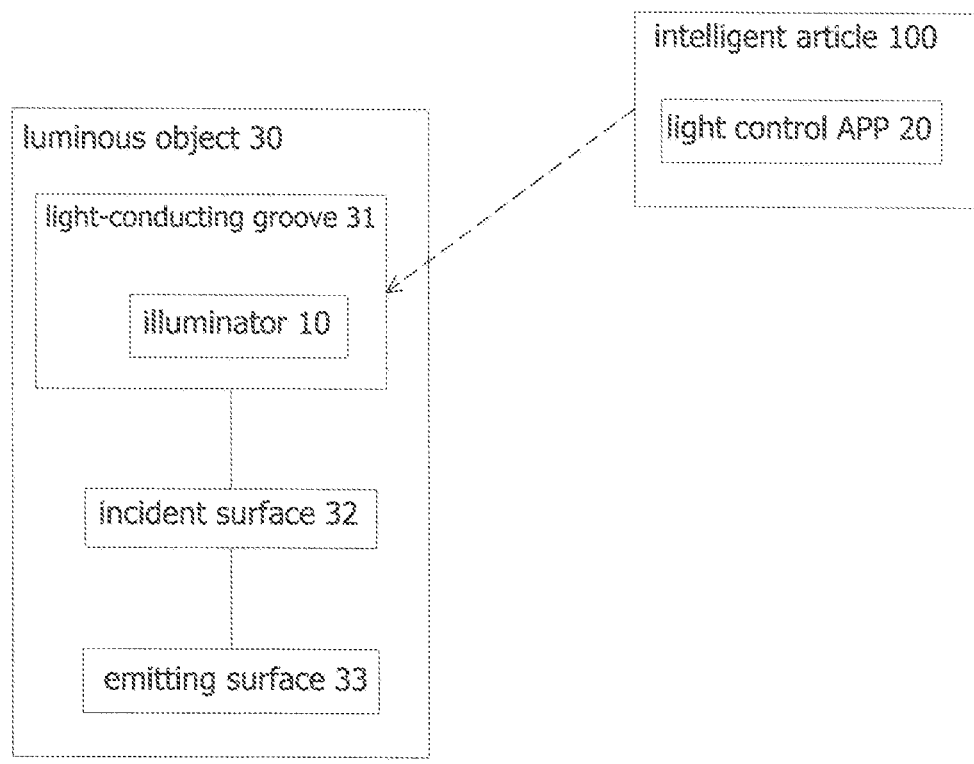
FIG. 1 is a block diagram of an intelligence light-emitting device integrated with illuminating object of the present invention.

Referring to FIG. 1, the illuminating object (30) is a transparent or semi-transparent block with light-conducting function. The block includes at least one light guiding groove (30 which can hold the light-emitting device (10). The light guiding groove (31) having an inner wall is a light transmissive surface, which is also an incident surface (32) where the light enters the block, and the outside of the block is a light emitting surface (33).

The illuminating object (30) is made of PU, TPR, TPU or polymethacrylate, which has a light-conducting function. The independent light-emitting device (10) is placed in the light guiding groove (31) of the illuminating object (30) and can be taken out or put in at any time. When the light-emitting device (10) emits light in the light guiding groove (31), the light is directly irradiated to the light transmissive surface of the light guiding groove (31), that is, the light is entered into the incident surface (32) of the block, and then is conducted through the transparent or semi-transparent block and to each side or multiple sides of the block, forming a luminous part. The luminous part is the light emitting surface (33). This condition is like a strip optical fiber. When the light source is admitted in one end (the incident surface) of the optical fiber, the light will, be conducted to the other end (the emitting surface) of the optical fiber, so that the other end thereof forms the luminous part. The light is emitted to the outside by the emitting surface (33) so as to achieve eye-catching, warning and safety effects at night.

Figure 3:
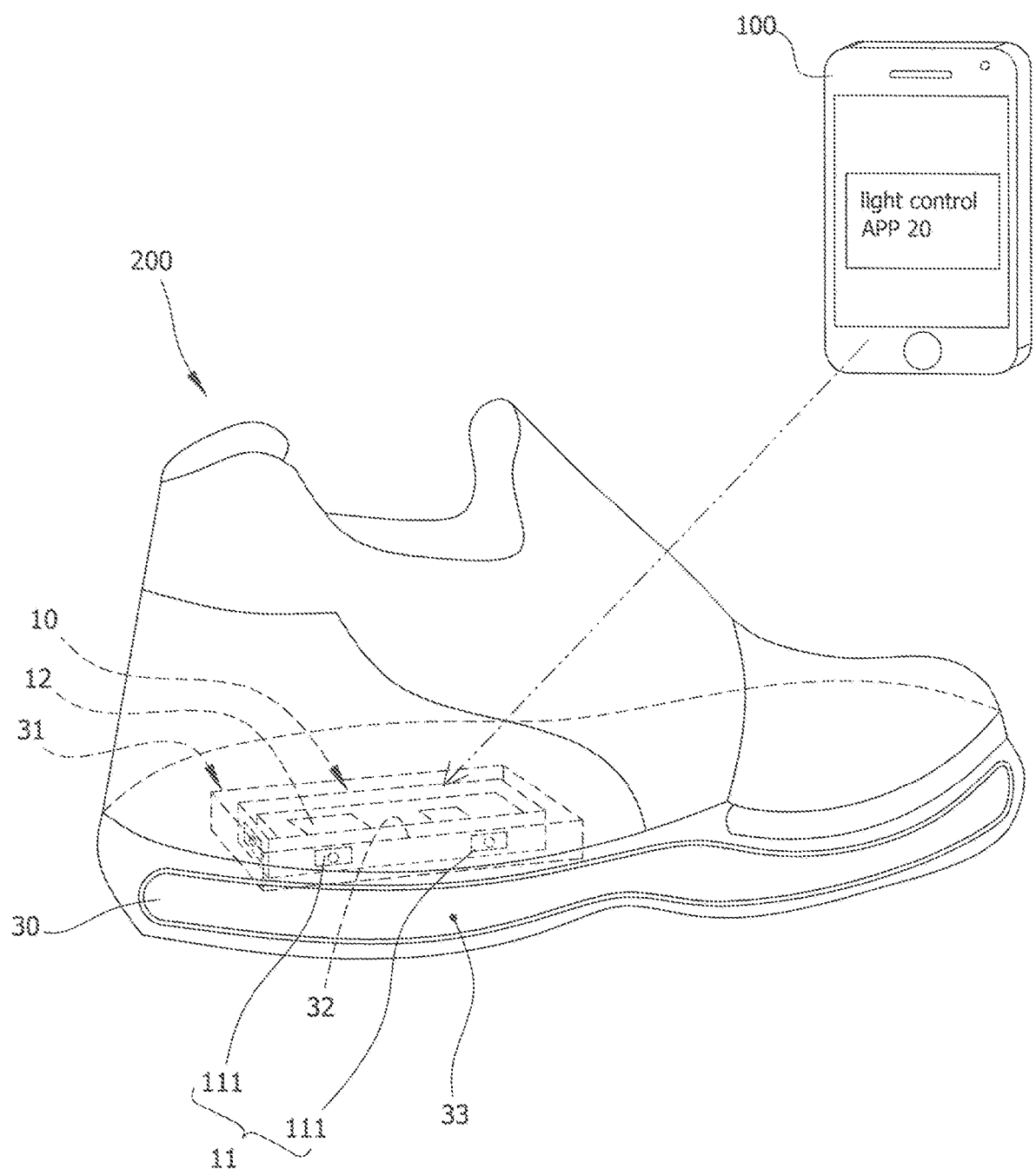
FIG. 3 is a schematic view of a shoe sole with the intelligence light-emitting device, integrated with an illuminating object of the present invention.

Referring to FIG. 3. The illuminating object (30) is a sole, and its periphery is exposed to the outside of the shoe body (200) so that the emitting surface (33) of the illuminating object (30) surrounds the outside of the shoe body (200). The illuminating object has a top surface covered with an insole and a bottom surface facing downwardly. The light-emitting device (10) is placed in the light guiding groove (31) of the illuminating object (30) so that it is also covered with the insole. The user can use a smart product (100), such as a smart phone, a smart watch or a smart wristlet, and use the light control APP (20) to wirelessly control the control unit (12), so as to switch on the LED light set (11) and control the light source display mode, such as the on/off, alternate flashing mode, brightness, frequency, color and chroma of LED light source.

Figure 4:
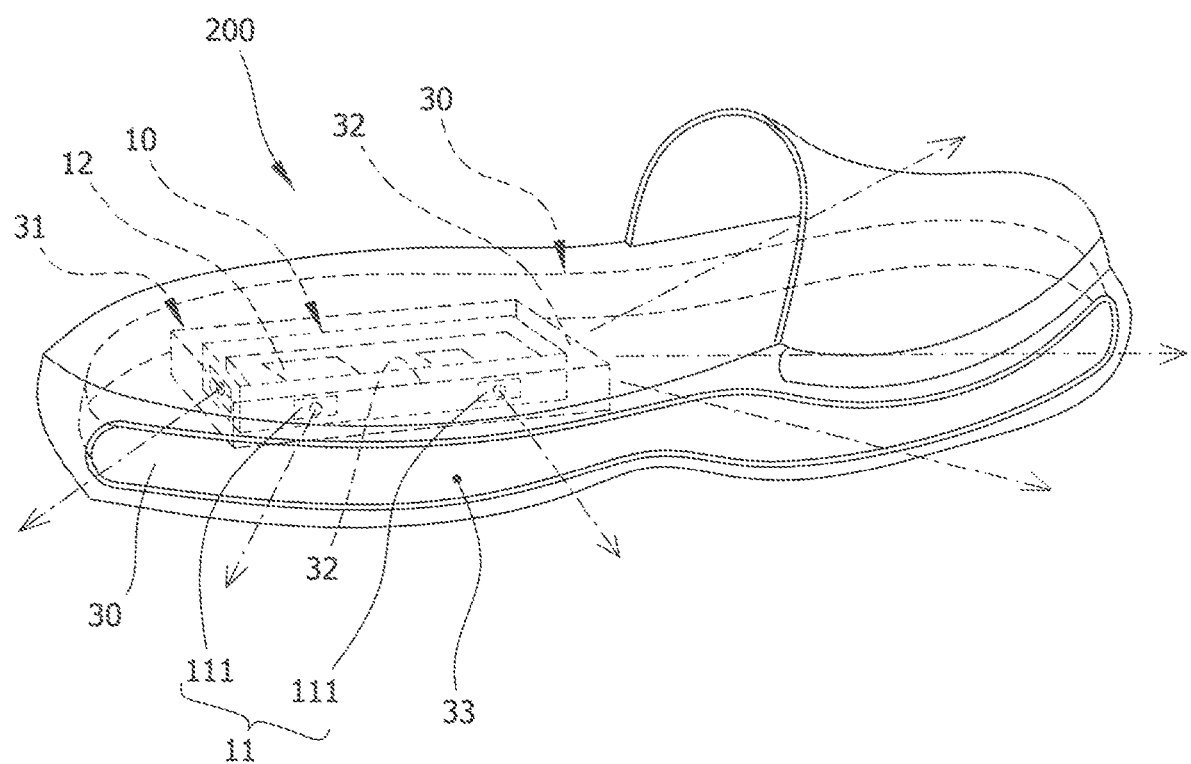
FIG. 4 is a schematic view of an embodiment showing the intelligence light-emitting device integrated with the illuminating object applied in a slipper.
Figure 5:
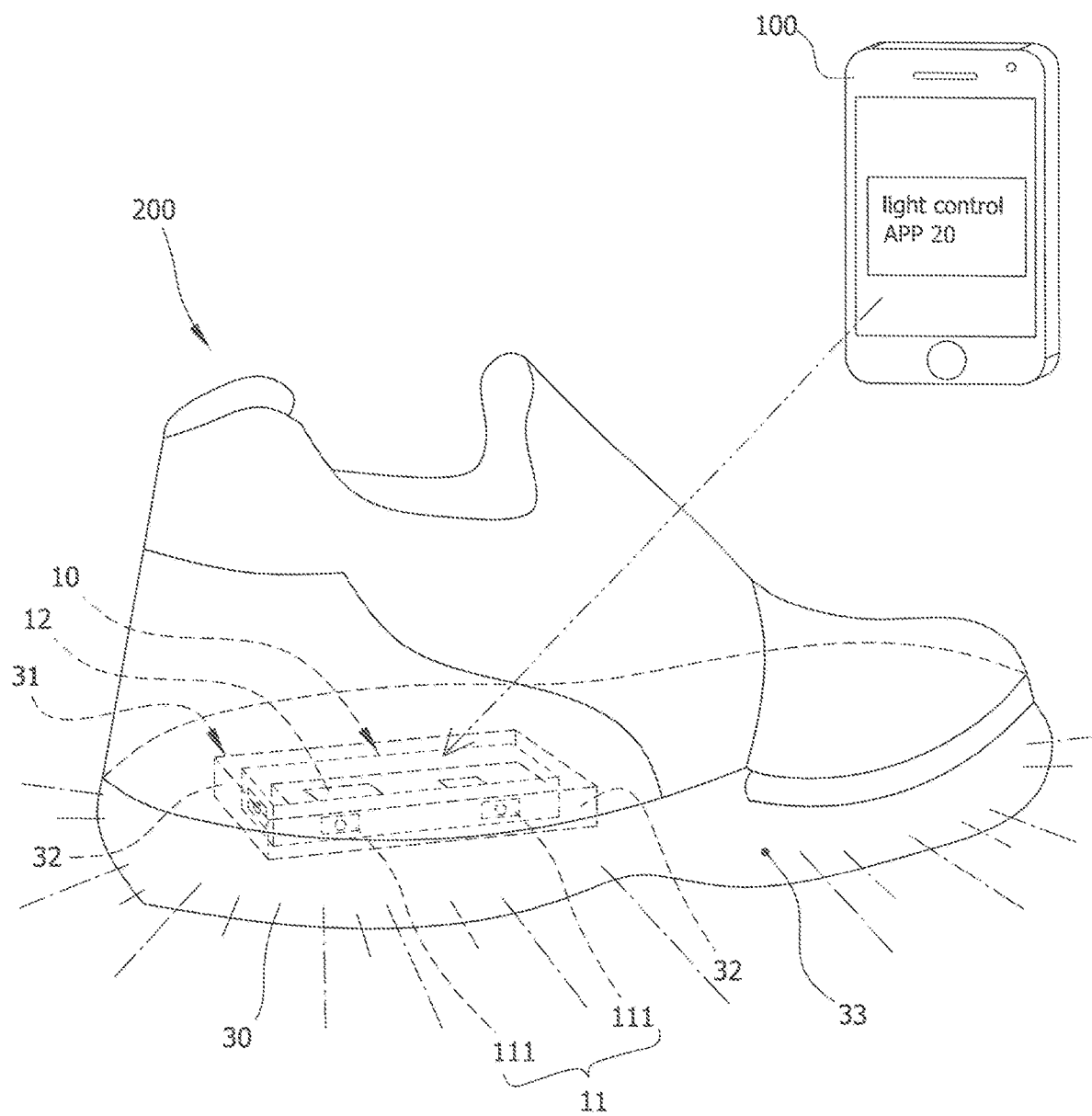
FIG. 5 is a schematic view of an embodiment showing the intelligence light-emitting device integrated with the illuminating object applied in a casual shoe.

Referring to FIGS. 4-5, the shoe body (200) in FIG. is any one of slippers, beach sandals and flat rubber shoes. The shoe body (200) in FIG. 5 is any one of casual shoes, sports shoes, jogging shoes, mountaineering shoes and rain shoes. The shoe body (200) comprises a body and a sole. Wherein the sole is the illuminating object (30) which includes the light guiding groove (31) to hold the light-emitting device (10). As the illuminating object (30) is made of transparent PU, TPR and TPU, it has excellent light conduction, flexibility and antifriction. The light-emitting device (10) is disposed in the light guiding groove (31) of the illuminating object (30), and it can be taken out or put in the light guiding groove (31) of other shoe bodies at any time. Therefore, the light-emitting device (10) can be put m the shoe body (200) to be worn at any time according to the user requirement. When the light-emitting device (10) emits light in the light guiding groove (31), the light is directly irradiated to the light transmissive surface of light guiding groove (31), that is, the light is entered into the incident surface (32) of the block, and then is conducted through the transparent or semi-transparent block, and to each side or multiple sides of the block, forming a luminous part. The luminous part is the light-emitting surface (33).

Said shoe body is an embodiment of the illuminating object (30), it can be used in various articles, such as a lamp holder. The lamp holder is a transparent or semi-transparent illuminating object. The light guiding groove is located in a bottom of the holder, and the light-emitting device is located in the light guiding groove. The holder is made of polymethacrylate for light conduction, firmness, bearing and protection. In addition, a box, the box having a bottom is a transparent or semi-transparent block, the light guiding groove is located in the bottom of the base, and the light-emitting device is located in the light guiding groove.

The advantage of the present invention is that the light-emitting device (10) is waterproof, portable and independent, not fixed in a specific object, so it can be removed to other objects of luminous effect with a light guiding groove at any time according to the user requirement, such as shoes, lamps, boxes and other independent objects of luminous effect. Therefore, its scope of application is extensive, and the light-emitting device (10) is not confined to a specific object Secondly, the wireless charging mode is applied, the light-emitting device can be charged without taking it out. The light control APP (20) of smart products (e.g. smart phone, smart watch, smart wristlet) can implement different light controls, that is more convenient. The rechargeable battery is high safety FLCB, which is unlikely to fire, burn or explode in the cases of overcharge, bending and puncture.

Figure 7:
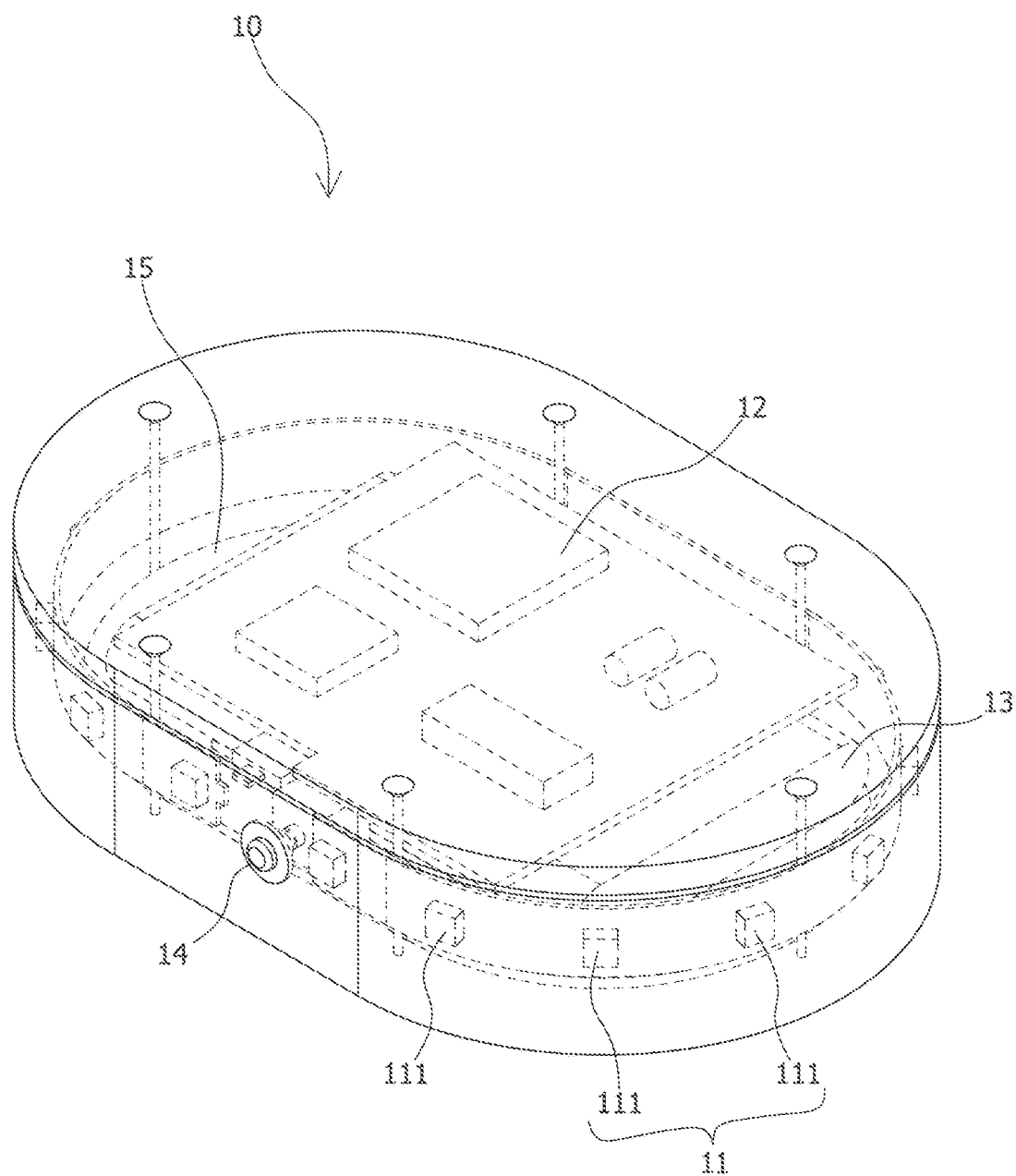
FIG. 7 is a schematic vie of a light-emitting device of another shape of the present invention.

FIG. 7 shows another embodiment of the present invention. The shape of the light-emitting device (10) may be elliptical or polygonal except for a rectangle.

Figure 8:
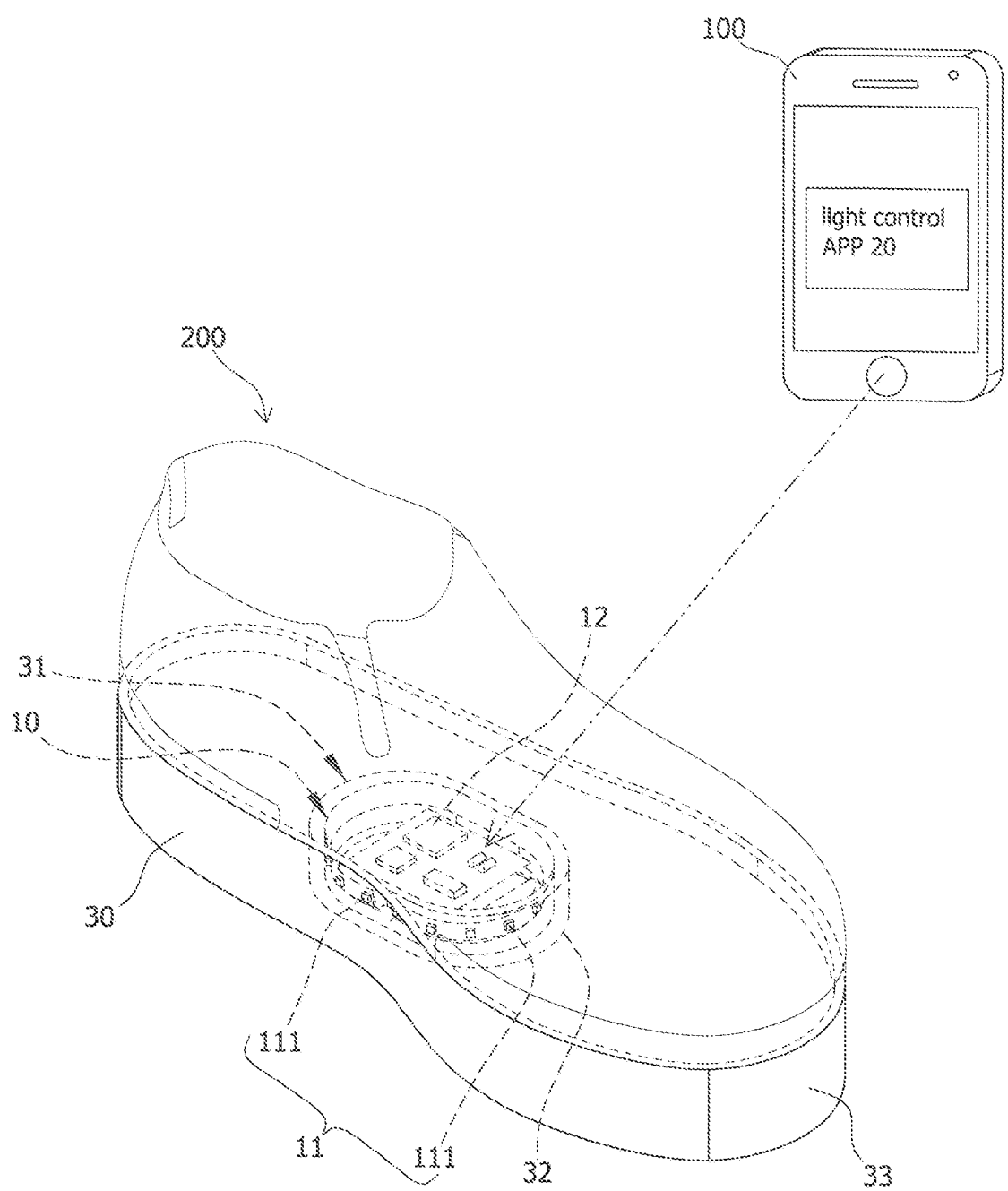
FIG. 8 is a schematic view showing the use of the intelligent light-emitting device with a smart product.
Figure 9:
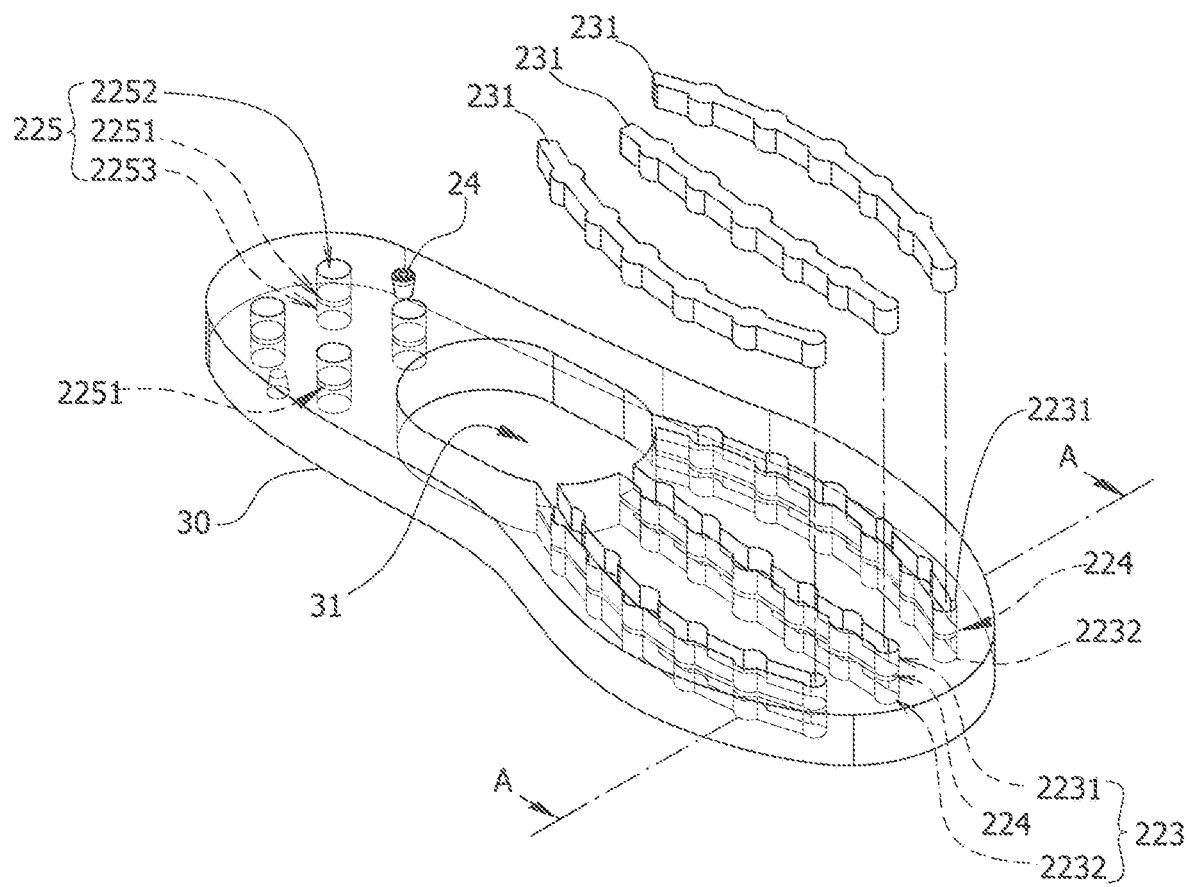
FIG. 9 is a schematic exploded view of the illuminating object of the present invention.
Figure 10:
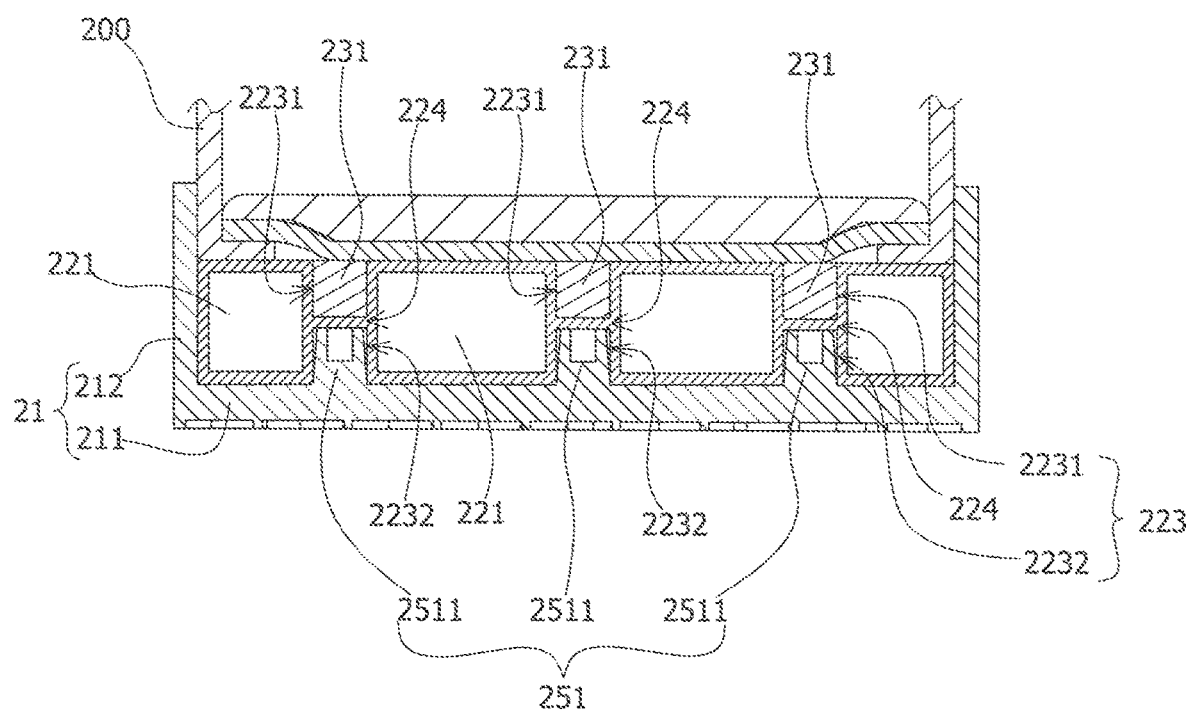
FIG. 10 is a schematic cross-sectional view showing A-A portion of FIG. 9.

FIG. 8 is a schematic view showing the implementation of the light-emitting device (10) in combination with the shoe body (200) and the smart product (100). Next, referring to FIG. 9 to FIG. 11, the inside of the illuminating object (30) forms a hollow and inflatable space (221); a top surface of the illuminating object (30) includes an inflation valve (24) communicating with the inflatable space (221), and the inflation valve (24) is externally connected to the air pump to input the gas into the inflatable space (221). The front end of the light guiding groove (31) longitudinally extends a plurality of light guiding gaps (223) communicating with the light guiding groove (31); the light guiding gaps (223) have first partitioning pieces (224) disposed at a central portion of the cross section, such that the light guiding gaps (223) are partitioned into upper and lower light guiding gaps (2231, 2232), and the upper light guiding gaps (2231) have light guiding strips (231) embedded therein.

In the above, when the light-emitting device (10) in the light guiding groove (31) emits light, the light can be directly transmitted from gap walls of the light guiding gaps (31) to the outer periphery of the illuminating object (30). At the same time, light can be indirectly transmitted to the outer periphery of the illuminating object (30) by the light guiding strips (231), so that the periphery of the illuminating object (30) forms a bright concentrated light.

The light guiding strip (231) is a PU, TPR, TPU material with excellent light guiding characteristics, which can guide light from one end to the other end, and the light guiding effect is superior to the illuminating object (30). The light of the light guiding strip (231) itself indirectly transmits light into the illuminating object (30), so that the periphery of the illuminating object (30) forms a higher brightness concentrating light. Therefore, the light guiding strip (231) is provided to make the brightness of the illuminating, object (30) brighter.

Figure 11:
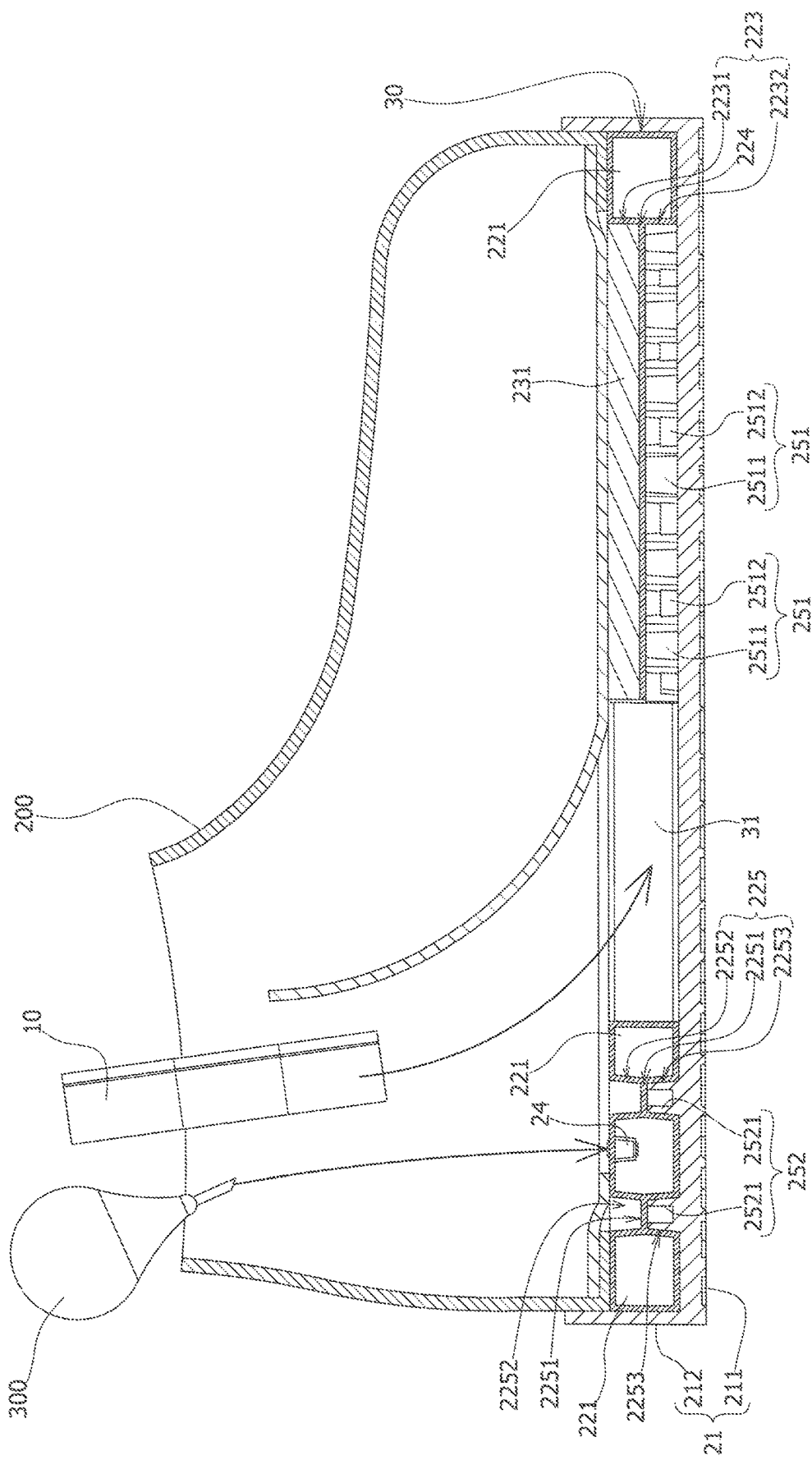
FIG. 11 is a schematic view of the light-emitting device connected to the air pump.

Next as shown in FIG. 11, the inflating space (221) and the inflation valve (24) can be used in combination with an air pump (300) to input gas from the inflation valve (24) to the inflating space (221), so that the illuminating object (30) can support the weight and impact of the foot, and provides excellent cushioning and shock absorbing effects during the movement.

Figure 12:
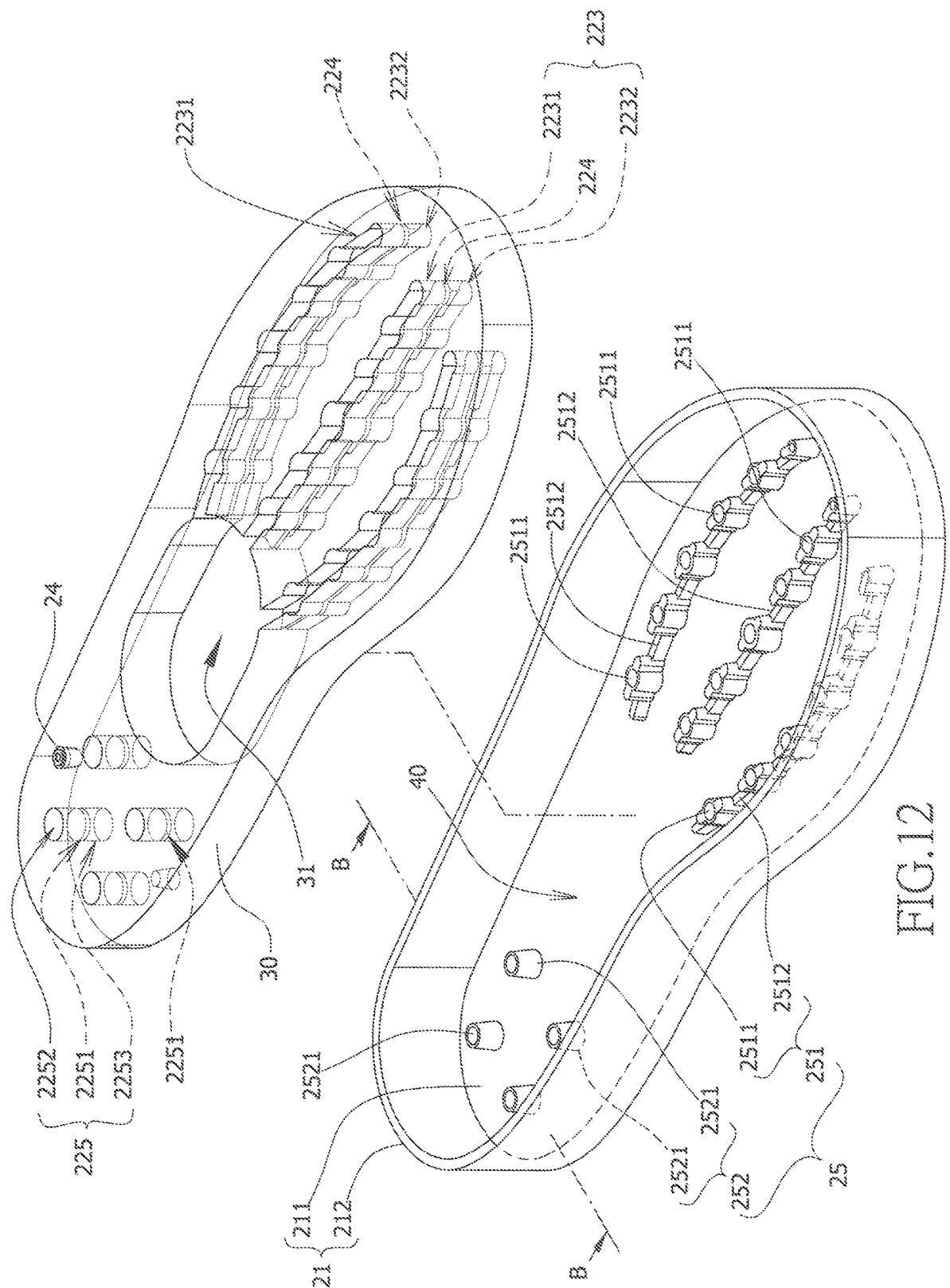
FIG. 12 is an exploded view of the illuminating object and an outsole of the shoe.
Figure 13:
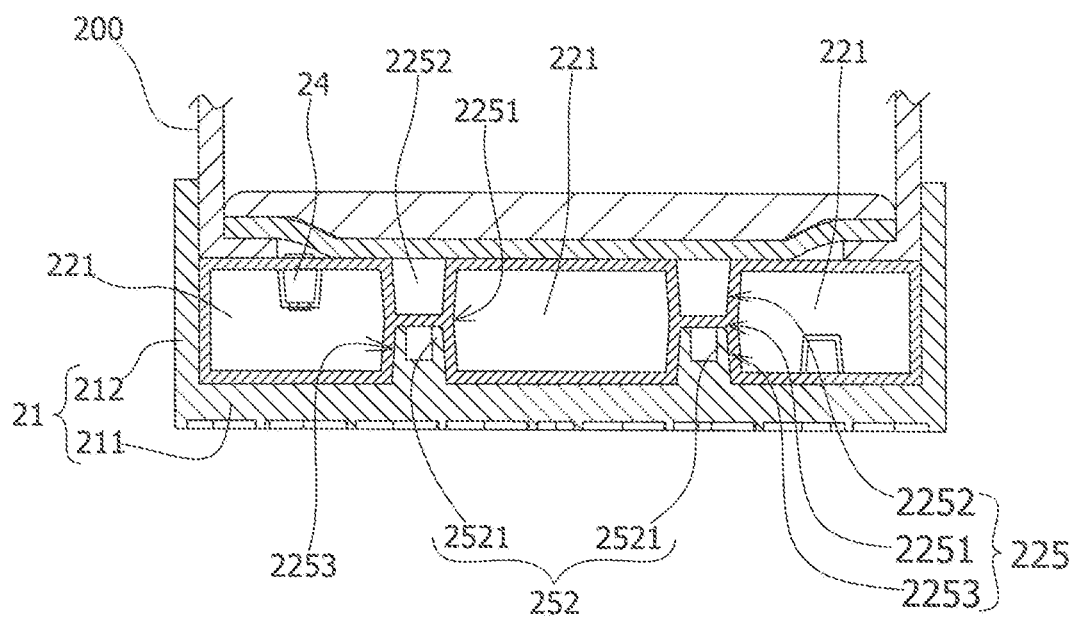
FIG. 13 is a schematic cross-sectional view showing B-B portion of FIG. 12.

Referring to FIG. 12 and FIG. 13, the top surface and the bottom surface of the illuminating object (30) are respectively provided with a plurality of holes (225), each hole (225) has a second partition piece (2251) disposed at a center of a cross section thereof, so that the hole (225) forms upper and lower receiving grooves (2252, 2253); furthermore, the illuminating object (30) is further provided with an outsole (21); the shoe outsole (21) includes a bottom portion (211), a wall surface (212) extending from a periphery of the bottom portion (211) to form an accommodation, space (40), a light-transmitting support portion (25) disposed on a top surface of the outsole (21). The light-transmitting support portion (25) includes first light-transmitting support members (251) correspondingly disposed and inserted into the lower light guiding gaps (2232), and the second light-transmitting support members (252) correspondingly disposed and inserted into the lower receiving grooves (2253). The first light-transmitting support members (251) are composed of a plurality of hollow first cylinders (2511) and connecting elements (2512) for connecting between the two first cylinders (2511), and the second light-transmitting support members (252) are formed by hollow second cylinders (2521).

The light-transmitting support portion (25) can not only position the illuminating object (30), but also provides good support and comfort for the illuminating object (30). When the wearer walks, the illuminating object (30) provides appropriate support through the light-transmitting support portion (25), so that the weight of the human body can be evenly distributed to the surface of the entire illuminating object (30) without causing elastic fatigue and deformation.

Secondly, the holes (225) and the light guiding grooves (223) of the illuminating object (30) are identical on the upper and lower sides. Therefore, it is not necessary to manufacture the illuminating objects of the left and right different feet (30).

I claim:

1. A intelligent light-emitting device integrated with an illuminating object, wherein the light-emitting device is an independent and removable component, comprising:
   a LED light assembly having a plurality of LED lighting modes;
   a control unit connected to the LED light assembly and configured to control different lighting modes of the LED light assembly, the control unit including a wireless remote control unit, remotely controlled by a light control APP of a smart product;
   a rechargeable battery, coupled to a bottom of the LED light assembly and configured to supply the power for operation;
   a wireless charging module, coupled to the bottom of the LED light assembly and configured to charge the rechargeable battery with the received energy by wireless charging method;
   a switch, disposed on the LED light assembly and configured to switch on or off the LED light assembly;
   wherein the illuminating object includes a transparent or semi-transparent block with light-conducting function and at least one light guiding groove configured to hold the light-emitting device; wherein the light guiding groove having an inner wall is a light transmitting surface, which is also an incident surface where the light emitted from the light-emitting device enters the block, and an outside of the block is a light emitting surface;
   wherein the light-emitting device is placed in the light guiding groove of the illuminating object and can be taken out or put in at any time; when the light-emitting device emits light in the light guiding groove, the light is directly irradiated to the light transmitting surface of the light guiding groove, and then is conducted through the transparent or semi-transparent block and to the outside thereof to form a luminous part;
   wherein an inside of the illuminating object forms a hollow and inflatable space; a top surface of the illuminating object includes an inflation valve communicating with the inflatable space, and the inflation valve is externally connected to an air pump to input the gas into the inflatable space; a front end of the light guiding groove longitudinally extends a plurality of light guiding gaps communicating with the light guiding groove; the light guiding gaps have first partitioning pieces disposed at a central portion of a cross section, such that the light guiding gaps are partitioned into upper and lower light guiding gaps, and the upper light guiding gaps have light guiding strips embedded therein; wherein the light guiding strips transmit light generated by the light-emitting device through a transparent or semi-transparent the illuminating object.

2. The intelligent light-emitting device integrated with the illuminating object according to a claim 1, wherein the smart product is a smart phone, a smart watch or a smart wristlet; the light control APP is downloaded into the smart product to wirelessly control the light-emitting device, so as to control the on/off, rolling mode, brightness, frequency, color and chroma of the LED light assembly.

3. The intelligent light-emitting device integrated with the illuminating object according to a claim 1, wherein the wireless remote control unit is a Bluetooth wireless transceiver for connecting the smart product.

4. The intelligent light-emitting device integrated with the illuminating object according to a claim 1, wherein the rechargeable battery is a FPC Lithium Ceramic Battery (FLCB).

5. The intelligent light-emitting device integrated with the illuminating object according to a claim 1, wherein the switch is a flat touch switch.

6. The intelligent light-emitting device integrated with the illuminating object according to a claim 1, wherein the illuminating object is made of PU, TPR, TPU or polymethacrylate, which has a light-conducting function.

7. The intelligent light-emitting device integrated with a illuminating object according to a claim 1, wherein the light guiding groove and the light-emitting device are engaged with each other, and can be of any shape.

8. The intelligent light-emitting device integrated with the illuminating object according to a claim 1, wherein the illuminating object is a shoe sole having a transparent or semi-transparent block with light-conducting function; the light guiding groove is located in the insole and corresponding to a wearer's heel.

9. The intelligent light-emitting device integrated with the illuminating object according to a claim 1, wherein the illuminating object is a lamp holder having a transparent or semi-transparent block with light-conducting function; the light guiding groove is located in a bottom of the holder.

10. The intelligent light-emitting device integrated with the illuminating object according to a claim 1, wherein the illuminating object is a box having a transparent or semi-transparent block with light-conducting function; the light guiding groove is located in a bottom of the box.

11. The intelligent light-emitting device integrated with the illuminating object according to a claim 1, wherein the top surface and the bottom surface of the illuminating object are respectively includes a plurality of holes, each hole has a second partition piece disposed at a center of a cross section thereof, so that the hole forms upper and lower receiving grooves.

12. The intelligent light-emitting device integrated with the illuminating object according to a claim 1, wherein the illuminating object is further provided with an outsole; the shoe outsole includes a bottom portion, a wall surface extending from a periphery of the bottom portion to form an accommodation space, a light-transmitting support portion disposed on a top surface of the outsole.

13. The intelligent light-emitting device integrated with the illuminating object according to a claim 1, wherein the light-transmitting support portion includes first light-transmitting support members correspondingly disposed and inserted into the lower light guiding gaps, and the second light-transmitting support members correspondingly disposed and inserted into the lower receiving grooves; the first light-transmitting support members are composed of a plurality of hollow first cylinders and connecting elements for connecting between the two first cylinders, and the second light-transmitting support members are formed by hollow second cylinders.

* * * * *